UNITED STATES PATENT OFFICE.

HALVOR HALVORSON, OF NORTH CAMBRIDGE, MASSACHUSETTS, ASSIGNOR TO HIMSELF AND WM. T. EUSTIS, ASSIGNORS TO THEMSELVES AND LEVI L. CUSHING, JR.

IMPROVED METHOD OF TREATING GOLD ORES.

Specification forming part of Letters Patent No. 52,490, dated February 6, 1866.

*To all whom it may concern:*

Be it known that I, HALVOR HALVORSON, of North Cambridge, in the county of Middlesex and State of Massachusetts, have invented a certain new and useful Process for Treating Gold Ores and Gold and Silver Bearing Ores; and I do hereby declare that the following is a full, clear, and exact description of the same.

In the first place I take a given quantity of ore, such as pervades the formations in Colorado and Nevada Territories, being gold and silver bearing iron pyritous ores, containing also copper, antimony, and lead in various proportions and combinations with silica, alumina, magnesia, and manganese, &c., breaking it up into small fragments with a sledge machinery or large hammer, pulverization being unnecessary for my purpose, and add thereto twenty-five per cent. of its weight of soda (NaO) or potash, (KO,) or their equivalents in their carbonates, preferring the neutral dry carbonate of soda, and, mixing the two pretty thoroughly, I subject this mixture in a suitable closed vessel to a gradually-increasing temperature until it reaches a bright red, and keeping there as evenly as possible for from three to four hours, the whole operation consuming from seven to eight hours for its completion. I next open the vessel, when I find the mass in tranquil fusion, and ladle it out on iron or stone plates, exposing the whole to atmospheric influences, for the purposes hereinafter mentioned. If, instead of ladling the fused mass out, it is suffered to cool, if it is in a crucible, and then this broken, the formation of three distinct and characteristic strata will be apparent, the lower or bottom one of which will be found of an iridescent, shining, pearly, chromic, crystalline fracture, the middle or second stratum of a black, glassy, vitreous, and conchoidal fracture, and the upper or third stratum, if the operation has been perfect, of a pure white crystalline fracture, leaving the impression of its crystallization upon the upper surface of the second stratum when removed therefrom by simple cleavage. Upon an analysis of these stratifications I find the lower one to be purely metallic, containing sulphide of iron, if soda enough has been used for the decomposition of the bisulphide of that metal in the ore under treatment—otherwise a portion of the latter salt still remains, but in quantities so small and under conditions so unimportant as to render it nearly unobjectionable to the attainment of the objects in view—sulphide of copper, sulphide of sodium, hyposulphite of soda, a small and variable amount of oxide and sulphide of antimony, gold, traces of silver and lead, and a body appearing to be a mineral acid or a metal in a state of oxidation reacting acid, being insoluble in sulphuric, hydrochloric, or nitric acids, or any of their combinations, but freely soluble in alkaline solutions, forming with them micaceous, pearly, brilliant, and permanent crystals, and again precipitated from this combination by either of the above-named acids as a light-blue, anhydrous powder, or, if the solution is very weak, as light floccula. It refuses any change by the blow-pipe. The color first suggested its being vanadic acid or oxide, but its reactions dissipate any such conclusion, and with our present knowledge its chemical characters dissemble anything of which the science of chemistry treats. By way of distinction, and for the want of a better name, I have called this body an "oxide of colorodium" as an unknown radical. This whole stratum disintegrates, heats, and swells somewhat similar to incinerated oxide of calcium when exposed to similar circumstances. When this stratum, whether as a lump or disintegrated, is immersed in warm, hot, or boiling water, a deep-green solution is obtained, nearly as deep and pure green as a solution of sulphate or chloride of oxide of chromium. If sulphuric or hydrochloric acid is added to this green clear solution, a precipitate occurs in which the oxide of colorodium is found, while a little sulphide of hydrogen is evolved, and the supernatant solution, being clear and white, contains sulphate and hyposulphite of soda; but if nitric acid is employed as the precipitant, copious fumes of nitrous acid are evolved and free sulphur precipitated with the new oxide, the supernatant solution holding nitrate and sulphate of soda. Traces of protoxide of iron and oxides of manganese and antimony are also found in this solution.

If, instead of being treated with acids, the solution under consideration be concentrated rapidly, a black flocculent matter separates, which is found to be protoxide of iron, resembling that of chalybeate waters. The coloradic soda-salt crystallizes and leaves a sirupy solution of sulphide and antimoniate of soda.

Whatever practical value is attached to the contents of this solution besides the soda is a matter for future investigation. For the present, the said lower stratum is washed with water until this passes colorless and neutral to test paper, (the first washing reacting highly alkaline,) the remaining powder is ready for treatment, hereinafter to be described. If, after being washed, it be submitted to heat in a proper covered vessel, the sulphur will sublime and the iron peroxidize.

The second or middle stratum contains the silica of the original ore, traces of alumina, magnesia, the free magnetic iron, oxide of the ore, sulphide of antimony, and soda, in about the atomic weight sufficient to have formed a sesqui-silicate with the silica of the ore, but derived from the soda applied to the process. This stratum is nearly permanent in the air, and is, of course, easily separated from the lower one, either by the spontaneous disintegration of the latter or by the easy cleavage through mechanical means. To this stratum I shall again refer in the course of my specification.

The third and upper stratum is nearly pure sulphate of soda, containing nearly one-half of the soda employed in the process.

Now, inasmuch as the operation has been performed in a close vessel and exclusion of air, nothing having escaped but a few bubbles of carbonic oxide at the safety-tube, as commonly arranged for the collection of gases, the rationale of the reactions taken place are that the soda has entirely parted with the carbonic acid it held when applied as a carbonate, and part of it reduced, as in the production of sulphide of sodium, by calcining its carbonate with sulphur, taking the sulphur from the second atom of that element in the bisulphide of iron in the ore, while the oxygen which this portion of the soda lost supplies it to another portion of sulphur for the formation of the hyposulphite, and the decomposition of the carbonic acid of the original soda-salt furnishes the oxygen for the saturation of the remaining sulphur for the production of sulphate of soda, the carbon of the carbonic acid going to the second stratum and uniting with the vitreous matter, as occurs in the manufacture of black glass and enamels; and, lastly, a portion of the sulphur unites with the oxide of copper in the ore, where it originally exists as such, and proven by the fact that it may be removed therefrom by ammonia and precipitated as sulphide by the introduction of sulphide of hydrogen to the cupro-ammonia solution, whereas no copper can be removed by ammonia from the lower stratum of my assay, it existing there as sulphide and as insoluble in ammonia as the above-mentioned precipitate in the ammonia solution.

Nothing apparently is deoxidized of the native ore, and no oxygen could be derived from any other source than the reaction suggested. No sulphur, either as such, sulphide of hydrogen, or sulphurous acid, has escaped from the apparatus; yet the bisulphide of iron is decomposed, leaving remaining neutral sulphide of iron susceptible of transformation to protosulphate of that metal by means described in another specification and pending the decision of the Patent Office for a grant of the claims therein made. I assume, therefore, my hypothesis correct, which may be expressed in the following formula and diagram:

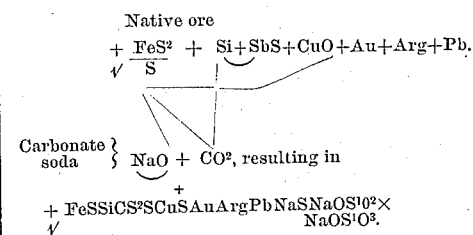

Whence it is evident that the perfection of the process depends upon the exactness of the atomic weights of ore and soda mingling for their mutual decompositions, and it is also obvious that an excess of soda will diminish the sulphate and increase the hyposulphite of that base, whereas, in proportion to its deficiency, either bisulphide of iron must contaminate the assay, or, if the heat in the process is carried far enough to decompose this excessive bisulphide, malform the manipulations by the evolution of sulphurous acid, or clog the channels of the apparatus by a sulphur sublimate.

In the elimination of gold from pyritous ores men seem to have reached almost a mania for what is termed "desulphurization" of ores by roasting in ingenious contrivances for artificial oxidation, creating currents and blasts for blowing what little gold may exist in the ores away into chambers and recesses, while the sulphur is absolutely wasted, the iron rendered useless except for reduction, and creating a labyrinth of circumstances which render difficult the utilization of other valuable contents of the ore under their treatment.

Desulphurization under the circumstances of rapid oxidation of oxidable matter may be well enough so far as it undoubtedly disintegrates the ore beyond the degree to which mechanical pulverization extends, and thus reaches infinite particles of gold; but whether such a proceeding is really economical is apocryphal.

That the desulphurization mania reaches gold directly is yet to be proven, as, so far as I am informed or my experiments extend, no sulphide of gold has ever been detected in any ore. That it may be artificially produced I am fully aware. I am equally aware that this sulphide is soluble in a certain menstruum, by which it could be removed from the ore and its existence therein proven; but no such demonstration has been made, and if it could be made would lessen the difficulties of obtaining the precious metal. Would not such a proof lead to the overthrow of geology by establishing a theory of solution instead of fusion for our geological formations? It is not, however, argued by our gold-seekers that all the gold in the ores exists as sulphide, or, as some still more advanced in science assert, as sulphate! Yet credit is due for the research and the suspicion that gold does exist in some combination screening it against the action of mercury in amalgamation, and such would be the case if the gold was a sulphide. Such is the case, and more—screening it, besides, against the action of nitro-hydro chloric acid, and even gaseous chlorine—the stannate of gold or purple of Cassius. I am not aware that any simple process has either been suggested or practiced for the separation of the elements constituting this body, as perhaps no occasion has especially required it, the stannate being always produced for a specific purpose; yet it is well known that it can neither be amalgamated by mercury nor dissolved in acids, and it is only supposed that gold separates from oxide of tin by strong ignition. I have ignited stannate of gold with bases, and found that the tin left the gold and united with the base, particularly soda. This fact suggested its employment on the ores of this base, and I find that a larger amount of gold is obtained from a given quantity of ore through this agency, as involved in this specification, than by any other (to me) known process. That this may be from an attenuated disintegration I admit; but, on the other hand, I know that, in proportion to the quantity of that body which I call an "oxide of colorodium" which soda removes from the ore, the amount of gold obtained is increased.

I have formed artificially a salt of gold from a solution of its chloride with the oxide of coloradium or coloradic acid in soda combination, and found it as impervious to the influence of reagents as ever the stannate of gold has been found. My inference has been that this combination pre-exists in the ore. This is strengthened by the fact that if a finely-pulverized portion of ore is treated for about an hour with a boiling solution of cyanide or cyanuret of potassa the filtered solution yields gold and the body coloradium, with some other matter contained in the ore, while, if the thoroughly-washed bottom stratum of my process are similarly treated, neither gold nor coloradic acid is obtainable, the latter body having been removed in the green solution and the gold remaining with the residue, as it would have done had it been a stannate. Again, the artificial colorodate or coloradide of gold resembles in color the stannate, and under the microscope similar particles may be seen in the finely-pulverized ore. Further research and time will decide whether my inference is correct.

The subject is worthy of pursuit, both as of scientific interest and technical importance. All the gold in the ore is not, however, in this condition or combination, being in a metallic state, as evinced by many tests and wide experience. But for the gold!

In my process it is obvious that, in whatever manner the gold is finally to be collected, a comparative small volume and less weight have to be manipulated than that from any process involving roasting, for although in these some of the sulphur of the bisulphide of iron is dissipated, yet the free magnetic oxide of iron of the ore remains, a large proportion of iron is peroxidized, increasing both in volume and weight, while not a particle of the silica and other materials has been affected or removed, while in mine the silica, the free magnetic oxide of iron, and at least a large proportion of the antimony, are removed from that part of the ore wherein to seek the precious metals, this weighing somewhat less than fifty per cent. of the ore under treatment. This diminished bulk I now submit to the action of mercury in a machine the specification and model of which are also in the Patent Office, subject to its decisions on my claims for inventions. In this machine are concentrated the conditions which I believe most promotive to the obtainance of gold. In it I propose to submit the matter under consideration to a solution of a mercurial salt, preferring the bichloride. During the agitation of the mass by the rotation of the tub in that machine I introduce sulphurous acid or any other suitable deoxidizing material, preferring the sulphurous acid, as that body contributes to more than one object. This, in the first place, reduces the mercury from its chlorine combination, leaving the metal extensively diffused for the seizure of the smallest particle of gold or silver in the tub, and, secondly, it appropriates the disengaged oxygen from the oxide of mercury for its conversion to sulphuric acid. This, again, performs two offices: first, it acts as an excitant to galvanic action upon the elements of a battery contained in said tub, and aids materially in keeping the negative element bright and clean for the reception of the amalgam thrown against it by the centrifugal force incident to the machine and the electric currents between the two elements of the galvanic battery.

As a further elucidation of my subject I refer to my specifications and model of said machine.

When the amalgamation and separation are complete as performed by this new machine, the gold-amalgam is collected and submitted to any known mode for the separation of its elements, the mercury being collected for future application, either as a metal or reconverted to a soluble salt. After the separation of the gold is consummated the remaining mass is removed from the tub and either exposed to atmospheric influences for its conversion into protosulphate of iron and copper or submitted to the action of another machine, an application for a patent for which is also before the Patent Office, and to which, in this connection, I refer as an auxiliary to this specification.

The bisulphide of iron, having been reduced by the process just described to a neutral sulphide, is easily metamorphosed to protosulphate of iron, and, as this occurs more rapidly than the same result is obtained on the cupruous sulphide, the protoxide of the iron sulphate is in condition to reduce the copper of the coming sulphate of that metal when its solution drops into that of the iron, as arranged for in the employment of the last-mentioned machine. The precipitated copper being removed now leaves the solution of the protosulphate of iron for such disposition as the prevailing circumstances of the locality may dictate.

The second or middle stratum of the fusion will now claim our attention. Its constitution has already been noticed. This glassy body I break up into small pieces, and adding thereto from twenty to twenty-five per cent. weight of oxide of lead, and subject the mixture, in a suitable open vessel, to a bright cherry-red heat, and continue it until no more jets of flame issue from the mass, as it does in the early fusion, and the fusion remains tranquil. If this, now, is suffered to cool slowly and the vessel containing it broken, two stratifications will be seen to have formed, the lower or bottom one of which will be found to consist almost entirely of sulphide of antimony, and the upper one—by far the larger—of a black glassy fine mass.

The lower stratum is of crystalline fracture, and gray, as native sulphide of antimony is. The upper stratum is of conchoidal fracture, and much finer texture than that of the previous melting, and contains, in addition to silica, &c., as previously described, the lead.

The lower stratum is easily reduced to metallic antimony by fusion with carbon, and the lead can also be readily recovered from the top stratum by any usual mode of fusion and reduction, when nothing remains but a worthless black glass or scoria.

The phenomenon of the second part of my process is exhibited in broken crucible No. 2. The lower stratum of this will also, like the first, spontaneously disintegrate by exposure to the atmosphere or water.

In practice the best mode of separation of the products of the two described fusions is to scoop or ladle the fused mass out on proper plates of iron, stone, or the like, letting disintegration of the lower strata separate them from the vitreous, which, remaining unacted upon, may be removed by a common rake.

The sulphate of soda of the third stratum of the first operation, being solid and anhydrous, should be collected by itself. The solutions from the washings of the lower strata of both operations, containing sulphide of sodium and hyposulphite of soda, by being left at rest will, by absorption of oxygen, rapidly become solutions of sulphate of soda, which may then be concentrated, crystallized, and added to the third stratum of the first operation and already collected, and all be reconverted to carbonate of soda for repeated uses by the known means of production of such carbonate from chloride of sodium through the incidental sulphate of soda of such process.

Having thus fully specified my process, what I claim as my invention, and desire to secure by Letters Patent, is—

The treatment of gold and silver bearing pyritous ores, in the manner and for the purposes herein described.

This specification signed this 8th day of May, 1865.

HALVOR HALVORSON.

Witnesses:
J. R. MORSE,
GEO. H. EUSTIS.